(12) United States Patent
Chatterjee et al.

(10) Patent No.: US 12,388,741 B2
(45) Date of Patent: Aug. 12, 2025

(54) ROUTING FOR STATIC BORDER GATEWAY PROTOCOL

(71) Applicant: Amazon Technologies, Inc., Seattle, WA (US)

(72) Inventors: Bradford Sachin Chatterjee, Snohomish, WA (US); Thomas Bradley Scholl, Seattle, WA (US); Michael W. Palladino, Renton, WA (US); Cheng-Jia Lai, Redmond, WA (US); Christopher Jason Brown, Seattle, WA (US); Yao Liu, Beijing (CN); Sasha Robbins, Strathfield (AU); Blake Hoelzel, Woodinville, WA (US); Eric Charles Briffa, Kogarah (AU); Madhura Kale, Seattle, WA (US); Dennis Marinus, Seattle, WA (US); Matt Chung, Renton, WA (US); Ibn Wendell Archer, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 17/590,285

(22) Filed: Feb. 1, 2022

(65) Prior Publication Data

US 2023/0246943 A1  Aug. 3, 2023

(51) Int. Cl.
*H04L 45/02* (2022.01)
*H04L 45/74* (2022.01)

(52) U.S. Cl.
CPC .............. *H04L 45/04* (2013.01); *H04L 45/02* (2013.01); *H04L 45/74* (2013.01)

(58) Field of Classification Search
None
See application file for complete search history.

(56) References Cited

U.S. PATENT DOCUMENTS

| 9,019,973 | B1* | 4/2015 | Shukla | H04L 45/66 370/395.31 |
| 2003/0039212 | A1* | 2/2003 | Lloyd | H04L 41/0823 370/252 |
| 2011/0032843 | A1* | 2/2011 | Papp | H04L 12/4666 370/254 |

(Continued)

FOREIGN PATENT DOCUMENTS

WO WO-2008092351 A1 * 8/2008 ............. H04L 12/66

OTHER PUBLICATIONS

Mohapatra et al., RFC-5512 The BGP Encapsulation Subsequent Address Family Identifier (SAFI) and the BGP Tunnel Encapsulation Attribute, Apr. 2009 (Year: 2009).*

(Continued)

*Primary Examiner* — Faruk Hamza
*Assistant Examiner* — Cassandra L Decker
(74) *Attorney, Agent, or Firm* — Klarquist Sparkman, LLP

(57) ABSTRACT

A system can determine by which path/tunnel an Internet destination can be best reached for a user with an IP address from a static BGP range. The system looks up the destination address in an egress map. This map can either specify a tunnel that should be used for encapsulation for static BGP, or (when tunnel is not present) cause the system to send out unencapsulated traffic, in which the traffic follows normal BGP routing on a border network.

20 Claims, 7 Drawing Sheets

(56) References Cited

U.S. PATENT DOCUMENTS

| | | | |
|---|---|---|---|
| 2016/0380823 A1* | 12/2016 | Shen | H04L 45/80 |
| | | | 370/254 |
| 2018/0159790 A1* | 6/2018 | Wang | H04L 45/42 |
| 2019/0081925 A1* | 3/2019 | Gottlieb | H04L 45/02 |
| 2021/0036887 A1* | 2/2021 | Meng | H04L 45/22 |
| 2021/0105209 A1* | 4/2021 | Tamizkar | H04L 45/74 |
| 2021/0385155 A1* | 12/2021 | Suryanarayana | H04L 45/76 |
| 2022/0045984 A1* | 2/2022 | Bareket | H04L 61/255 |

OTHER PUBLICATIONS

Machine translation of WO 2008/092351 (Year: 2008).*

* cited by examiner

ROUTING FOR STATIC BORDER GATEWAY PROTOCOL

BACKGROUND

There are telecommunication carriers, for example, certain major telephone companies, whose IP transit charges for traffic from computer networks are very high, especially for a Border Gateway Protocol (BGP) service. However, some carriers offer two options for IP connectivity which are less expensive: static routing and a hybrid routing option called "static BGP". While static routing is a significant cost savings over traditional (or dynamic) BGP transit, it has the drawback that services (e.g., cloud service or data center) must use IP addresses assigned by each carrier to originate traffic destined for that carrier. For example, to send traffic to a first carrier, services must source traffic from their prefix (e.g., 10.100.200.0/24), and services cannot use this to originate traffic destined to another carrier. This adds significant complexity to the service and is not appropriate where the service's customers or users expect to use a single IP address to reach all Internet destinations, regardless of the intermediate carrier.

DETAILED DESCRIPTION

Figure 1:
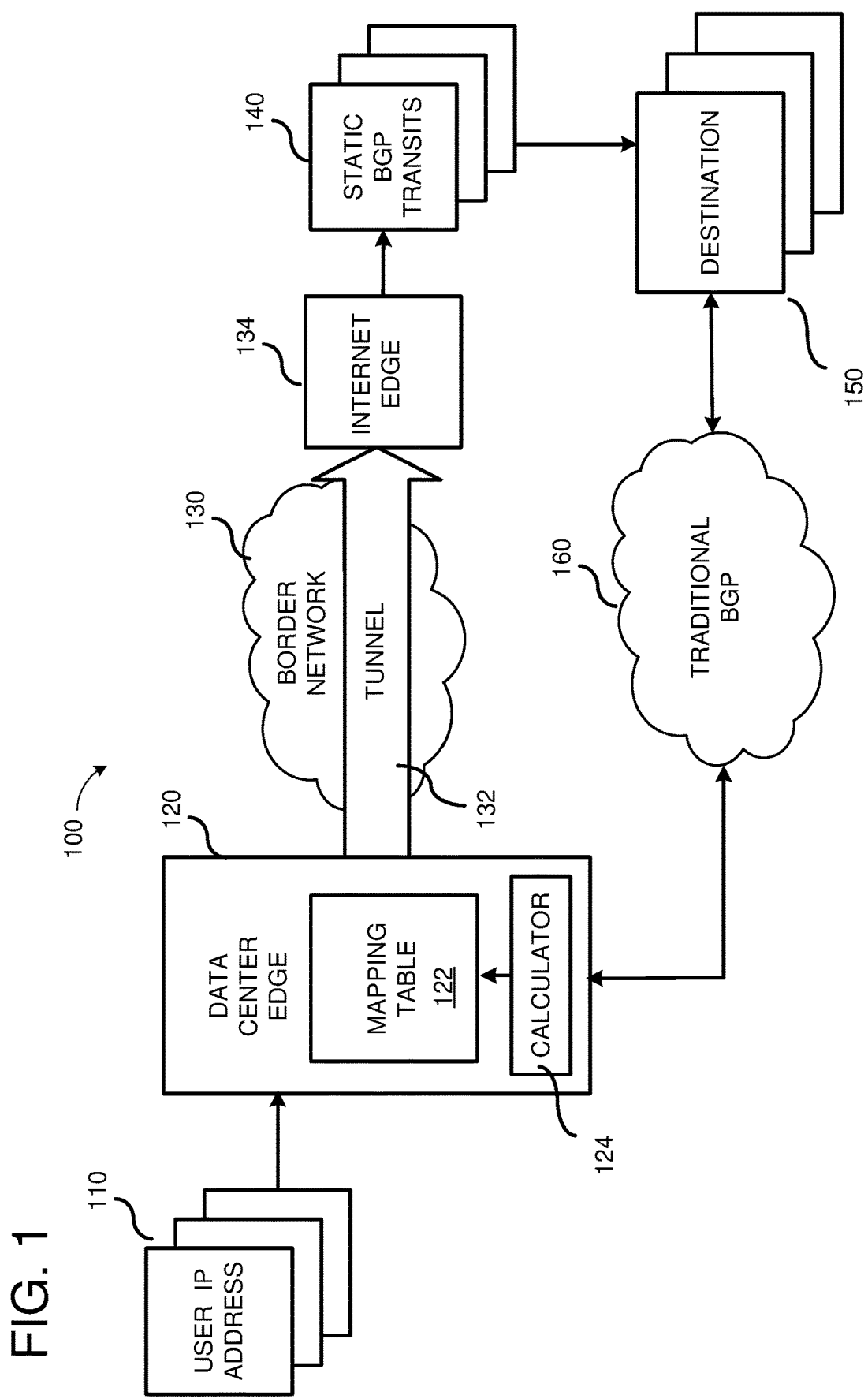
FIG. 1 is an example system diagram for providing static BGP routes.

Static routing provides an IP address allocation to route a prefix of the IP address allocation on a statically configured route. A static BGP service allows a service provider, e.g., a cloud service provider, to assign its own prefixes, which carriers can advertise for the service provider over the Internet. The carriers statically route traffic destined for those prefixes to the service provider over the static BGP interfaces. This way, the service provider's customers or users using the static BGP service can reach any destination from a single IP address while retaining a cost saving associated with static routing. While static BGP service has a low per Mbit cost compared to traditional BGP (which can also be referred to as standard or dynamic BGP) service, it has a high cost associated with each prefix "advertised" to the carriers. Therefore, in an example, customers or users (of a service provider) with low bandwidth usage per IP address can continue to use a traditional BGP service, where the service provider can advertise a large number of prefixes at low cost per prefix. Then static BGP can be offered to select high bandwidth usage users. Users can be "allow-listed" onto these new static prefixes and receive IP addresses from them. When a user with an IP address from a static BGP range makes an outbound request, the system can determine by which path/tunnel this Internet destination can be reached. For example, the path can be the most efficient path, including shortest path, lowest latency path, lowest cost, etc. It can do so, for example, by looking up the destination address in an egress map. This map can either specify a tunnel that should be used for encapsulation, or (when tunnel is not present) cause the system to send out unencapsulated traffic. The traffic can then follow normal BGP routing on the border network. In some embodiments, as described in further detail herein, the system can choose an egress carrier and interface for outbound traffic (e.g., at the border network), as there is no dynamic signaling over the static BGP interfaces. The system can then direct that traffic to the chosen interface.

In some embodiments, the system can select outbound traffic path by parsing BGP data and dynamically place the correct next-hops in a routing table.

In some embodiments, where a carrier provides Internet transit to the service provider, the carrier can accept and route (outbound) traffic for any destination via the static BGP circuits. In this case, the service provider can assign prefixes to a tunnel endpoint corresponding to that carrier. In the case of multiple carriers, the assignment can be done, as an example, in a round robin manner. When a carrier withdraws a route from BGP, traffic may continue to route to that carrier. In this case, the carrier can route the traffic according to their default route, or a route received from a peer.

Generally, the system can intelligently route user traffic on the best available path, respond to network failures and traffic shifts, and enable traffic engineering. The system can use a mapping tool (or calculator) to process BGP data into a destination/next-hop entry. The destination/next-hop entry can be stored, for example, in a mapping or routing table (or egress map). The mapping tool can also provide the system with the ability to respond automatically to failures or to shift tunnels.

In some embodiments, the system can provide the carrier with a range of IP addresses. The carrier can, in turn, announce these prefixes as if those ranges originated from the carrier. The announcement can be made to the Internet via traditional (or dynamic) BGP. In some situations, traffic crossing these static BGP links advantageously costs significantly less than the traditional (or dynamic) BGP based links.

At a high level, the system can include a source-based routing method. For example, the system can perform source-based routing on the egress path (e.g., from a data center to the public Internet). In some implementations, a source-based routing can require: (1) source IP addresses that are registered to a "Static BGP IP" pool, (2) destination IP prefix-lists and their next-hops/tunnel IDs. The Static BGP IP pool (or Static BGP pool) can include a range of IP addresses, e.g., a/20 prefix. In an example, the system can store the Static BGP pool via a configuration file. Other implementations are also contemplated.

The size of the destination IP prefix-lists and their next-hops/tunnel IDs information can be significantly larger and changes more frequently than the source IP address prefixes. For example, there can be hundreds of thousands of 1Pv4 prefixes, of which tens of thousands can be announced from the carrier. Many of these prefixes can change (e.g., added or removed) each day. In an example, the system can store the data (prefix, next-hop/tunnel ID) in a database, for example by streaming it to a storage area. This information can then be polled periodically.

In some embodiments, the system can encapsulate static BGP traffic for destination IP addresses that match against the prefix lists, for example, at the border network. The system can use an IP based encapsulation protocol, for example, generic routing encapsulation (GRE), IP-in-IP, Layer 2 Tunneling (L2TP), etc. The encapsulation can allow intermediate routers in a border network to use static BGP paths. The paths also allow the traffic to be routed to the static BGP carriers.

It should be noted that the system can also support IP addresses that do not belong to the Static BGP pool, e.g., in the case there is no match in the prefix lists when looking up the destination address. In this case, the system can send their data in unencapsulated traffic that is forwarded towards the border network.

In some embodiments, when there is a link failure, the system can back up static BGP links with other static BGP links. For example, the system can accomplish this with anycast addresses for the static BGP tunnel endpoints. In an example, all circuits assigned to the service provider at the carrier can use the same anycast tunnel endpoint address. When a single circuit fails, that tunnel can be removed from service automatically and traffic can fail over to the other circuit(s). In this case, no routing table updates at the system may be required. It should be noted that there can be more than one tunnels for each transit.

When all links to a single carrier (e.g., in a geographic area) are unavailable, traffic can automatically fail over (re-route) to backup tunnel endpoints, for example, on another carrier's static BGP links. This can be accomplished by advertising the anycast tunnel endpoint of the opposite carrier with a higher metric. In this way, the backup tunnel endpoint can only be selected when no primary tunnel endpoints are available for that anycast address. When there is no backup tunnel to another carrier's static BGP links, traffic packets can be decapsulated onto a traditional (or dynamic) BGP path.

Under some circumstances outbound traffic shift can be needed. Outbound traffic shift can be accomplished by disabling the outbound tunnel endpoint on the system (e.g., on a router). Traffic can automatically shift to the next available static BGP endpoint. The traffic shift can be with the same carrier or the traffic shift can use an alternate carrier only as backup when all of the same carrier links are down.

In some embodiments, when the system detects deteriorated service on a single static BGP link for a carrier, but other links to that carrier, e.g., in a geographic area, remain healthy, the system can shift traffic from that link. This can require disabling the outbound tunnel for that link and administratively disabling the link itself. In some situations, it can be necessary to turn the link down to stop attracting inbound traffic. At this point, the carrier can be engaged for troubleshooting.

In some embodiments, the system can detect deteriorated service on all static BGP links for a single carrier, e.g., in a geographic area. For example, the system can include a user configurable threshold on observed availability on the links. The system can observe sudden increase in round-trip-time (RTT), client retransmits, etc. When the threshold is reached, the system can shift all the static BGP links for that carrier in the affected geographic area. Traffic can then fail over to another carrier. At this point, troubleshooting the issue can be done to return the links to service.

In some implementations, the system may not control the advertisement of static BGP prefixes by upstream carriers, and it may not have immediate control over inbound traffic engineering for static BGP. As the system may not be able to backup static BGP sessions with traditional BGP sessions, the system can shut down the static BGP link. This results in a shift of the traffic to another static BGP link.

In some embodiments, the system can allocate BGP tunnels from an allocation pool, per site as defined effectively from the router region stored in a Peering Service. This allocation can occur sequentially per region/pool and is not selected specifically by the service provider.

As mentioned above, the system can perform source-based plus destination routing on the egress direction, for example, from a data center or cloud server to the public Internet. When receiving traffic data, the system can look up source IP in the Static BGP pool to determine if there is a match. In some implementations, the Static BGP pool data structure can locate in a statically allocated array. Next, the system can check the destination IP. For example, the system can check the destination IP in a routing table or map created from network reachability analysis. In some implementations, the system can check the destination IP using longest prefix match (LPM). The system can then encapsulate the data (packet), for example as GRE, if the destination IP matches a prefix list.

In some embodiments, a mapping calculator can be used to build the mapping or routing table. The mapping calculator can receive as input, for example, network layer reachability data, tunnel encapsulation information (including encapsulation bits) and the operational status of each tunnel, traffic shift status of the tunnel endpoint (e.g., endpoint routers), operational device status (such as whether a device or link goes in or out of service), and dataset contains reachability information for the networks behind each tunnel. The mapping calculator can also receive other data as input, for example, performance data, capacity data, latency data, packet loss data, business logic data such as dollar cost data, service level agreement data, requirement and/or agreement data with third-party or transit centers (e.g., 80% of traffic can be routed using static BGP), etc.

When there are routing changes in the network, information can be updated in a short time (e.g., within 5 minutes) and mapping can be re-calculated. When there are reachability changes in the network, information can be updated in another short time (e.g., within 1 minutes) and mapping can be re-calculated. Reachability changes can include device/link failures, and changes based on health probe results.

In some embodiments, when multiple tunnels exist for the same destination, the system can use non-equal-cost and non-even-capacity multi-pathing. For example, the system can aggregate two links that are in two separate buildings, or the system can choose to split traffic arbitrarily (e.g., 70/30) based on external inputs. In some embodiments, the system can use equal-cost multi-path (ECMP) routing. ECMP routing is a routing strategy where packet forwarding to a single destination can occur over multiple best paths with equal routing priority.

FIG. 1 shows an example system 100 for providing static BGP. For example, the system 100 can route user traffic on the best available path, respond to network failures and traffic shifts, and enable traffic engineering. The system 100 can use a mapping tool (or calculator) 124 to process BGP data into a destination/next-hop entry. The destination/next-hop entry can be stored, for example, in a mapping or routing table (or egress map) 122. The mapping tool 124 can also provide the system with the ability to respond automatically to failures or to shift tunnels. Although data center 120 is shown in FIG. 1, the features described herein for system 100 can also be located at other suitable network locations.

In some embodiments, the system 100 can first learn about network reachability for IP destinations 150. For example, using traditional (or dynamic) BGP network 160, the system can learn and store data regarding the best paths for BGP sources to reach the IP destinations 150. The best paths can be used to route static BGP traffic. This data, along with other data, as described in more detail below, can be fed into the mapping tool or calculator 124. The calculator 124 can use the best paths information to assign one or more tunnels 132 for the BGP sources in the mapping table 122. For example, when the data center 120 receives traffic data from the user source IP address 110, the system can use the IP destination address in the data packets to look up a tunnel 132 from the mapping table 122 and route the traffic data through the tunnel at the service provider's border network to an Internet edge device 134. The Internet edge device 134 can then route the traffic data to the transit 140 over static BGP links. The transit 140 can be at a carrier, an Internet Service Provider (ISP) or entity that provides transit connectivity.

In some examples, the system may include a script to crawl through each of the destinations 150 to determine which static BGP transits 140 are the best transits to place the destinations on.

Figure 2:
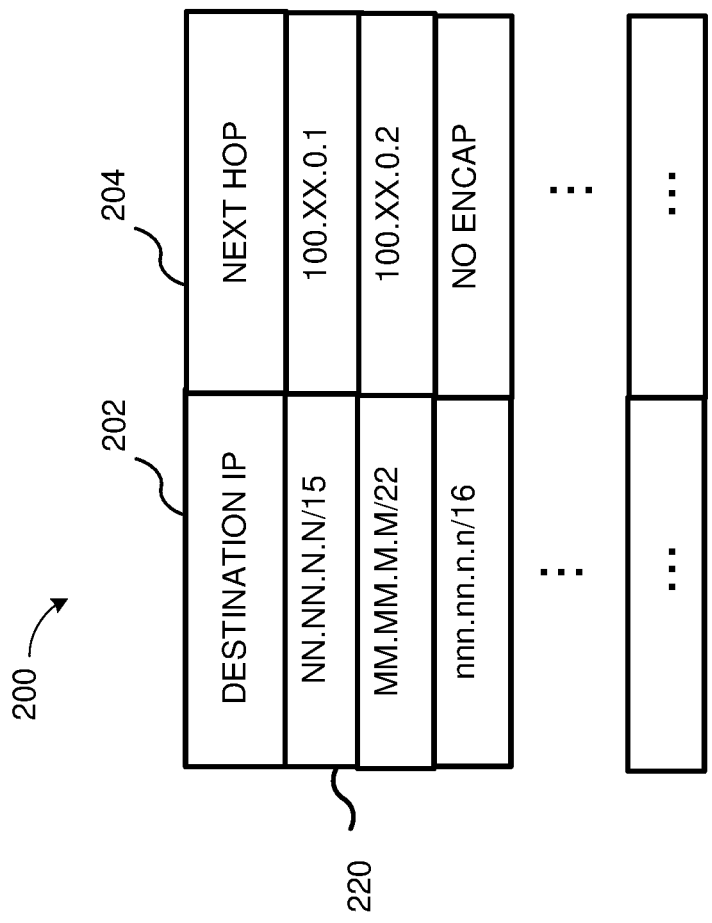
FIG. 2 shows an example of a data structure storing a routing map.

FIG. 2 shows an exemplary a data structure 200 for storing a routing map, similar to mapping table 122 in FIG. 1. Each entry 220 can include a destination IP prefix 202 and its next-hop/tunnel ID information 204. A tunnel can direct traffic to a desired transit center 140. A "NO ENCAP" entry can indicate that no tunnel is associated with the destination IP prefix. Data traffic destined for that destination IP prefix is not encapsulated for static BGP.

Figure 3:
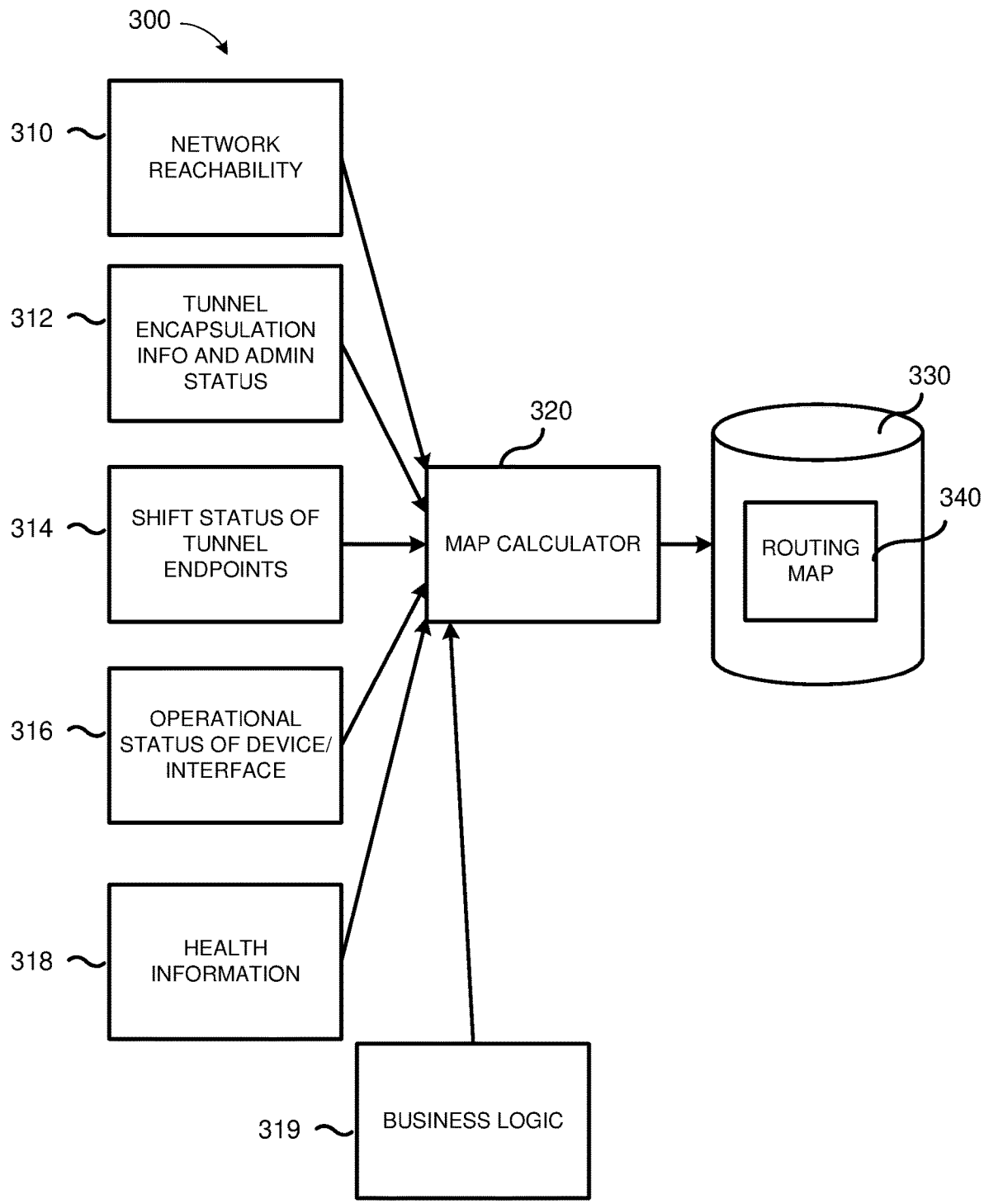
FIG. 3 shows a high-level system diagram depicting a map calculator.

FIG. 3 shows a high-level system diagram 300 depicting a map calculator 320, similar to calculator 124 in FIG. 1. For example, the map calculator 320 can receive multiple sources of input to calculate and create/update a routing map 340. In an example, inputs to the calculator can include reachability data 310, tunnel encapsulation information and administration status 312, shift status of tunnel endpoints 314, operational status of device/interface 316, health information 318, business logic data 319, and so on. As described herein, the reachability data 310 can include traditional (or dynamic) BGP reachability data for identified destination addresses. In some embodiments, the reachability data 310 can be developed or learned using BGP Monitoring Protocol (BMP) in exporting BGP data from routers. For example, the data can come from border network layer where best path calculations can be done. In some examples, the best path calculation can include a combination of multiple calculations from multiple network layers. From this data, the system can learn about the actual paths. For example, the data can indicate the networks that the BGP traffic took from a source to a destination. From this data, the system can also determine the transit or carrier for the best path and next hop and transform into tunnel endpoint.

The encapsulation information and administration status 312 can include, for example, GRE endpoints to send data traffic from a data center edge to an Internet edge (similar to data center edge 120 and Internet edge 134 in FIG. 1). The shift status of tunnel endpoints 314 can include status of routers (e.g., in or out of service) that traffic can be directed to. The operational status of device/interface 316 can include status (e.g., up/down status) associating with the transit centers/carriers. The health information 318 can include failure information at the transit centers/carriers, for example, packet loss information, congestion information, etc. The business logic data 319 can include dollar cost data, availability data, service level agreement data, requirement and/or agreement data with third-party or transit centers, etc.

In some embodiments, the map calculator 320 can analyze the inputs to build mapping table or routing map 340. For example, the map calculator 320 can include a script to crawl through each of the destinations in 310 to determine which static BGP transit centers are the best transits to place the destinations on. The routing map 340 can be stored in data structure 200 in database or storage area 330.

Figure 4:
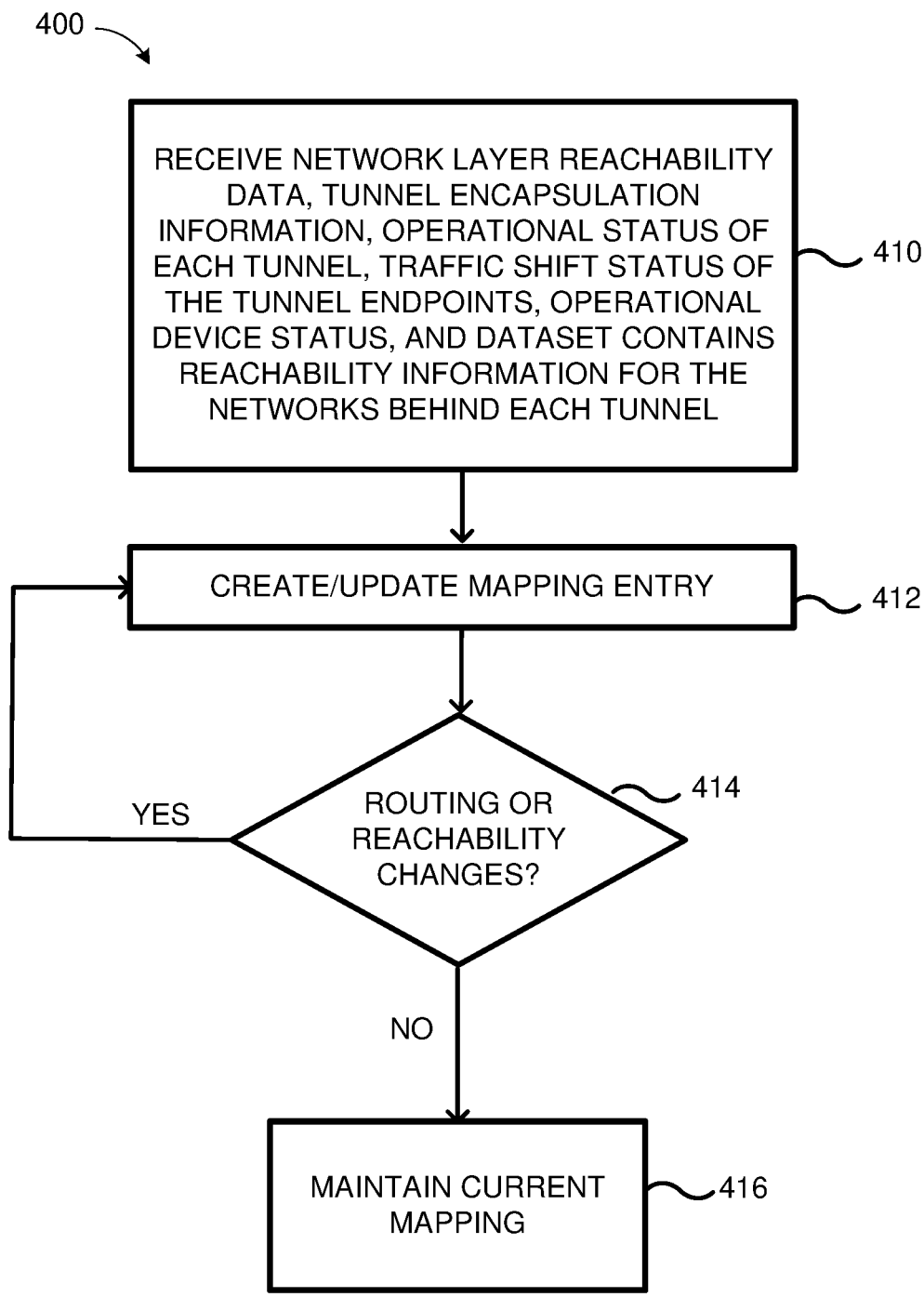
FIG. 4 shows an example flowchart of a method for creating and maintaining a routing map.

FIG. 4 shows an example flowchart diagram 400 for creating and maintaining a routing map. In process block 410, a system for creating and maintaining and routing map can receive multiple inputs including, for example, network layer reachability data, tunnel encapsulation information, operational status of each tunnel, traffic shift status of the tunnel endpoints, operational device status, and a dataset that contains reachability information for the networks behind each tunnel. These inputs and others are described in FIG. 3. In process block 412, the system can use/analyze the inputs to create an entry in a routing map, similar to routing map 340. In some examples, the system can receive status updates regarding routing or reachability data, for example, for a destination address. In process block 414, the system can determine whether there are changes in the routing or reachability data. If the determination is positive, the system can return to process block 412 and update the mapping entry for the destination address. For example, the update can include a new next-hop address for the destination address. If the determination at process block 414 is negative, in process block 416, the system can maintain the current routing map, or mapping scheme.

Figure 5:
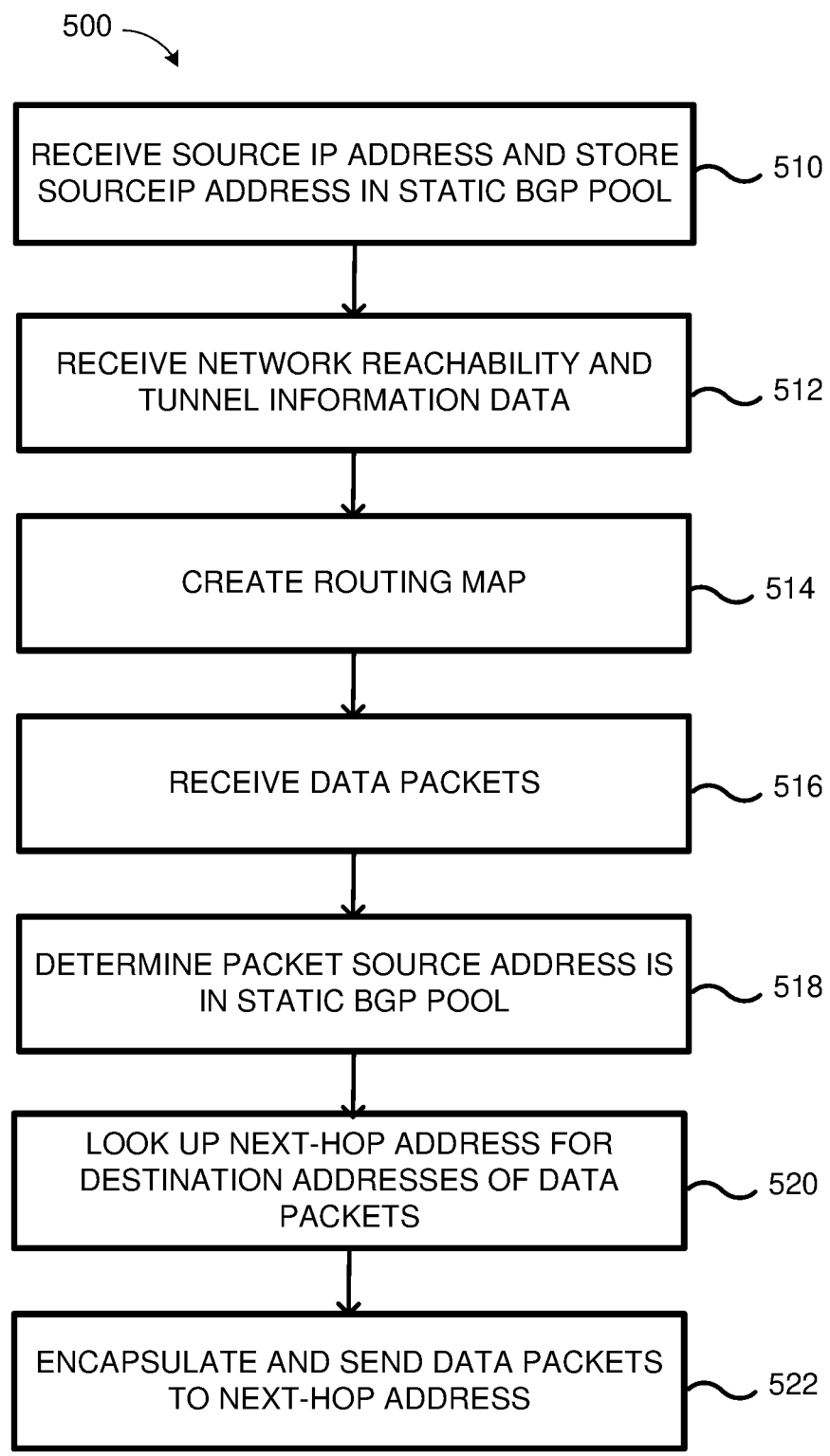
FIG. 5 shows an example flowchart for performing source-based plus destination routing in an egress direction.

FIG. 5 shows an example flowchart diagram 500 for performing source-based plus destination routing on the egress direction, for example from a data center 120 or cloud server to the public Internet via Internet edge 134 as shown in FIG. 1. In process block 510, the system can receive a source IP address and store the address in a Static BGP pool. The Static BGP pool can include source addresses that are allowed to use static BGP routing. In some implementations, the Static BGP pool data structure can be in a statically allocated array. Other allocations are also contemplated. In process block 512, the system can receive network reachability and tunnel information data. In process 514, a mapping tool or calculator can create a routing map based at least on the network reachability and tunnel information data. In process block 516, when receiving traffic data, the system can look up (process block 518) the source IP address in the data packets in the Static BGP pool to determine if there is a match. A match can mean the data comes from a source (e.g., customer or user) that can be routed using static BGP. Once a match is found, in process block 520, the system can look up the destination IP address in the routing map created in process block 514. In some implementations, the system can look up the destination IP address using longest prefix match (LPM). LPM can help find the longest prefix that matches the destination IP address and/or the most specific route for the IP address. In process block 522, the system can then encapsulate the data (packet), for example as GRE, if the destination IP matches a prefix list and send the data through the tunnel, at the next-hop address associated with the destination IP address in the routing map.

Figure 6:
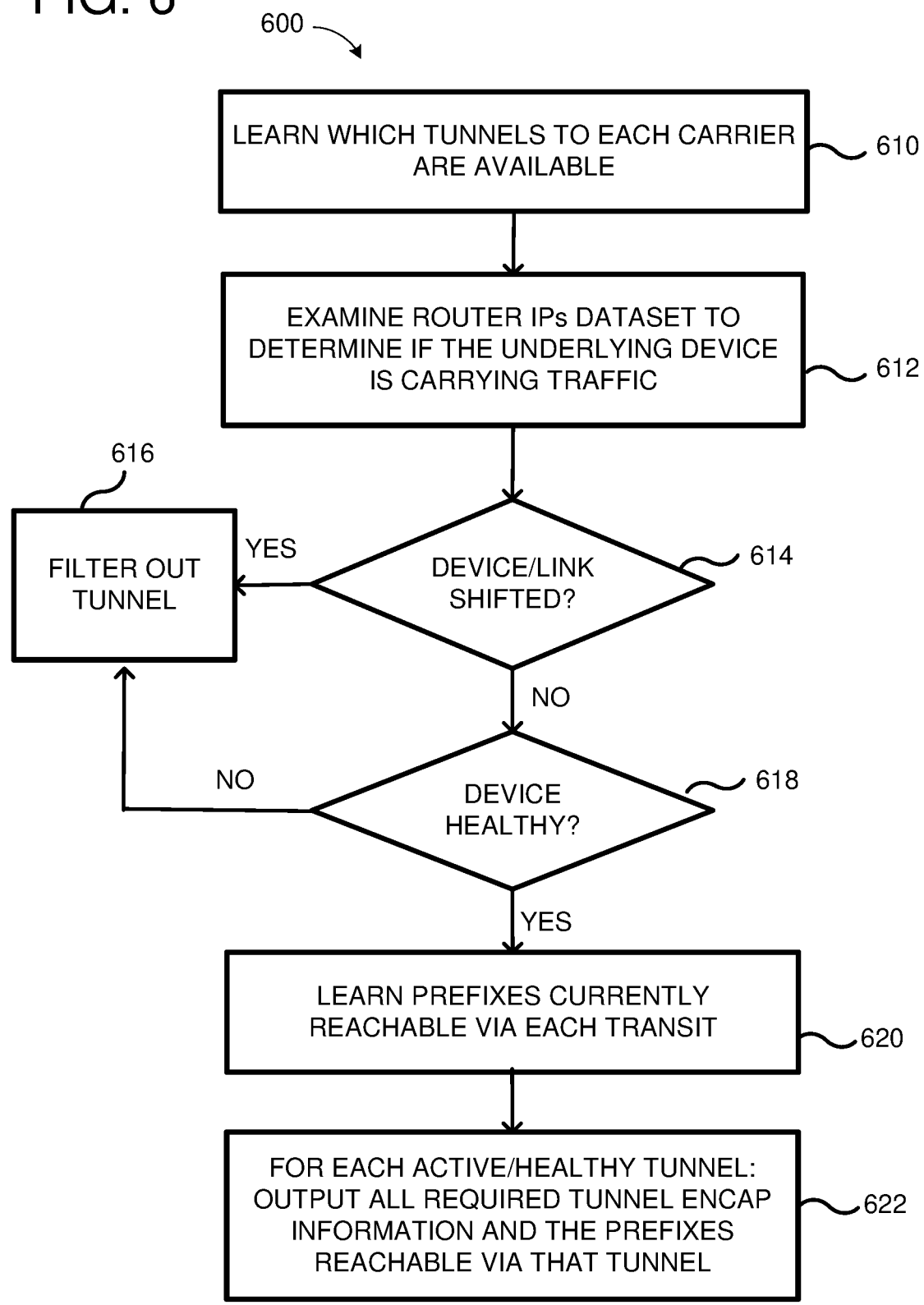
FIG. 6 shows an example flowchart for maintaining tunnel information for routing static BGP traffic data.

FIG. 6 shows an example flowchart diagram 600 for maintaining tunnel information for routing static BGP traffic data. In process block 610, the system can learn which tunnels to each carrier are available. For example, the system can use the tunnel encapsulation information and administration status 312 as shown in FIG. 3. In process block 612, the system can examine a router IPs dataset to determine if the underlying device is carrying traffic. For example, the system can examine the shift status of tunnel endpoints 314 data. In process block 614, the system can determine whether the device or link has been shifted. If the device or link has shifted, in the process block 616, the system can filter out the tunnel. For example, the system can update the next-hop/tunnel ID field in the routing map. If the determination in process block 614 is negative, in process block 618, the system can determine whether the device associated with the tunnel is healthy (e.g., up and running). If the device is not healthy, in the process block 616, the system can filter out the tunnel. If the device is healthy, in process block 620, the system can learn that the prefixes for the tunnel are currently reachable via each transit center/carrier. Then in process block 622, for each active/healthy tunnel, the system can output all required tunnel encapsulation information and the prefixes reachable via that tunnel.

A data center referred to herein can be a physical building or enclosure that houses and provides power and cooling to servers of a cloud provider network. Customers or users can connect to availability zones of the cloud provider network via a publicly accessible network (e.g., the Internet, a cellular communication network) by way of a transit center (TC). TCs are the primary backbone locations linking customers to the cloud provider network and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Figure 7:
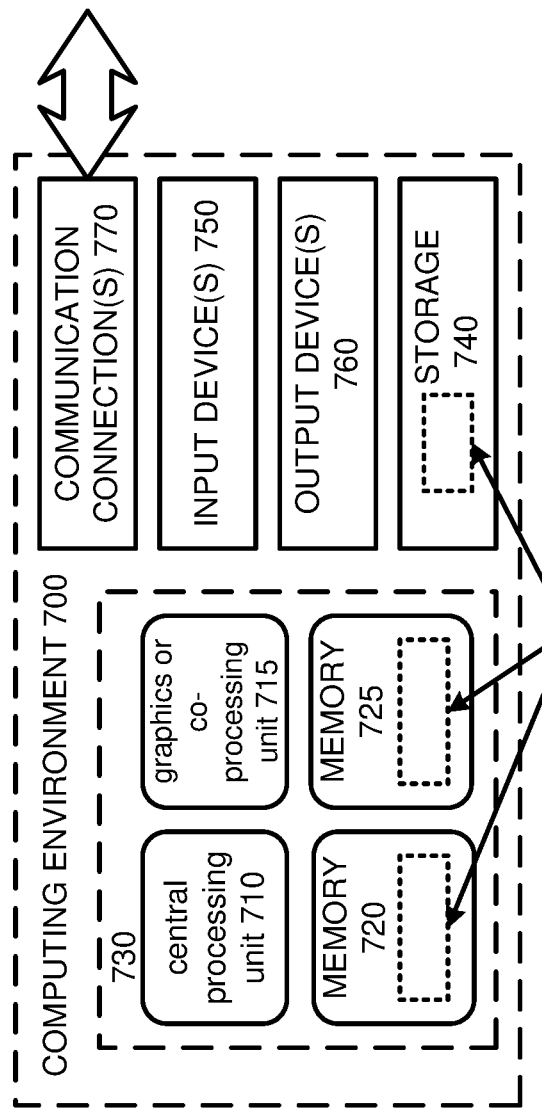
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer executable method of providing static Border Gateway Protocol (BGP) routing, the method comprising:
   receiving a source IP address;
   storing the source IP address in a static BGP pool, wherein the static BGP pool includes a range of IP addresses offered to users by a cloud service provider and the IP addresses within the BGP pool are static prefixes that are designated to use static BGP;
   receiving network reachability data for one or more network destination addresses, wherein the network reachability data includes dynamic BGP data paths to reach the one or more network destination addresses;
   receiving tunnel information of one or more tunnels;
   analyzing the network reachability data and the tunnel information to create a routing map for using static BGP, wherein the routing map for using static BGP includes a destination address and a next-hop address;
   receiving a data packet, the data packet including the source IP address and a packet destination IP address;
   upon determining that the source IP address is in the static BGP pool, looking up a next-hop address for the packet destination IP address in the routing map, wherein the next-hop address belongs to a static BGP route; and
   encapsulating the data packet for transport via a tunnel of the one or more tunnels to the next-hop address.

2. The method of claim 1, further comprising receiving operational status of each of the one or more tunnels, traffic shift status of endpoints of the one or more tunnels, operational status of one or more devices associated with the one or more tunnels, and a dataset containing reachability information for networks behind the one or more tunnels.

3. The method of claim 2, wherein creating the routing map for static BGP further includes analyzing the operational status of each of the one or more tunnels, the traffic shift status of the endpoints of the one or more tunnels, the operational status of the one or more devices associated with the one or more tunnels, and the dataset containing reachability information for networks behind the one or more tunnels.

4. The method of claim 2 further comprising:
   receiving a change status in the reachability data or the operational status of the one or more devices; and
   updating the routing map.

5. The method of claim 4, wherein updating the routing map includes updating the next-hop address.

6. The method of claim 1, wherein the packet destination IP address is one of the one or more network destination addresses.

7. The method of claim 1, wherein the next-hop address causes the data packet to be sent to a transit center using static BGP.

8. A computer-readable medium, which is non-transitory, comprising computer-executable instructions that, when executed, cause a computing system to perform a method comprising:
   receiving network reachability data for one or more network destination addresses;
   analyzing the network reachability data to create a routing map for static Border Gateway Protocol (BGP) routing;
   assigning, by a cloud service provider, a range of IP addresses to users to be used as static BGP addresses;
   storing the range of IP addresses in the routing map within the cloud service provider;
   receiving an outbound request including an IP address within the range of IP addresses; and
   determining that the IP address is within the routing map for static BGP routing and using the routing map to determine a tunnel for which the IP address can be reached.

9. The computer-readable medium of claim 8, wherein the network reachability data includes dynamic BGP data paths to reach the one or more network destination addresses.

10. The computer-readable medium of claim 8, further comprising receiving tunnel information of one or more tunnels and operational status of each of the one or more tunnels, and wherein the tunnel information includes a next-hop address.

11. The computer-readable medium of claim 10, further comprising analyzing the tunnel information of the one or more tunnels and the operational status of each of the one or more tunnels to create the routing map for static BGP routing.

12. The computer-readable medium of claim 8, further comprising analyzing business logic data to create the routing map for static BGP routing.

13. The computer-readable medium of claim 8, wherein the routing map for static BGP routing includes a destination address and a next-hop address.

14. A system for providing static Border Gateway Protocol (BGP) routing, the system comprising one or more processors configured to:
   assign, by a cloud service provider, a range of IP addresses to a user to be used as static BGP addresses;
   store the range of IP addresses in a routing map within the cloud service provider;
   receive a data packet, the data packet including a source IP address and a destination IP address;
   look up the source IP address in a list of IP addresses that includes the range of IP addresses within the routing map;
   upon determining that the source IP address is in the list of IP address, lookup a next-hop address for the destination IP address in the routing map, wherein the next-hop address belongs to a static BGP route; and
   encapsulate the data packet for transport via a tunnel to the next-hop address.

15. The system of claim 14, wherein the next-hop address is a tunnel identification.

16. The system of claim 14, wherein the routing map is created using at least network reachability data, tunnel information and router status.

17. The system of claim 16, the one or more processors further configured to:
   receive a change status in the reachability data or the router status; and
   update the routing map.

18. The system of claim 17, wherein updating the routing map includes updating the next-hop address.

19. The system of claim 14, wherein the next-hop address is an interface address at a transit center.

20. The system of claim 14, wherein the next-hop address causes the data packet to be sent to a transit center using static BGP.

* * * * *